May 13, 1930.  W. W. PRICE ET AL  1,758,760
AIR DRIVEN IMPLEMENT OR TOOL
Filed June 17, 1924  2 Sheets-Sheet 1
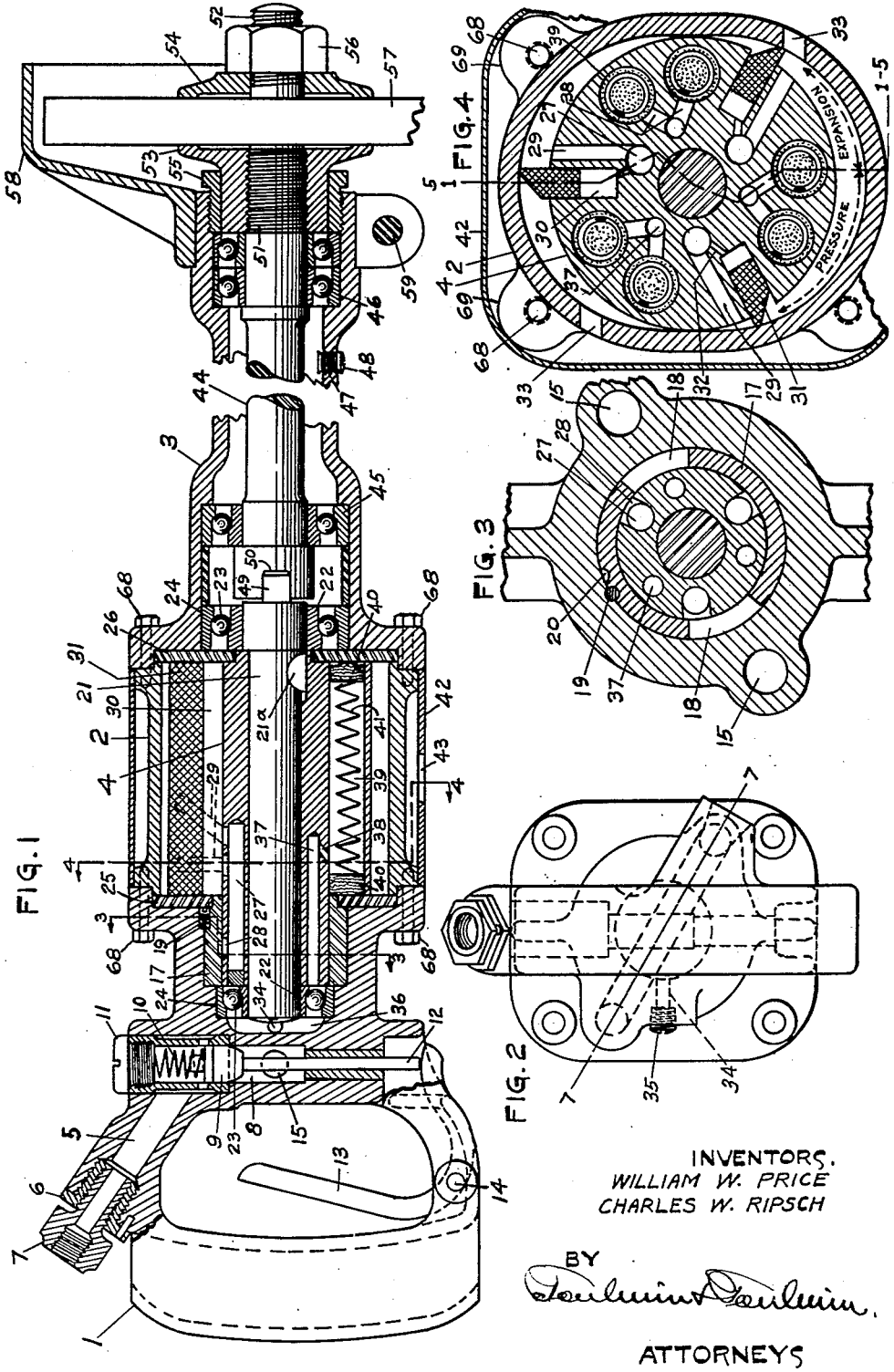
INVENTORS.
WILLIAM W. PRICE
CHARLES W. RIPSCH
BY
ATTORNEYS

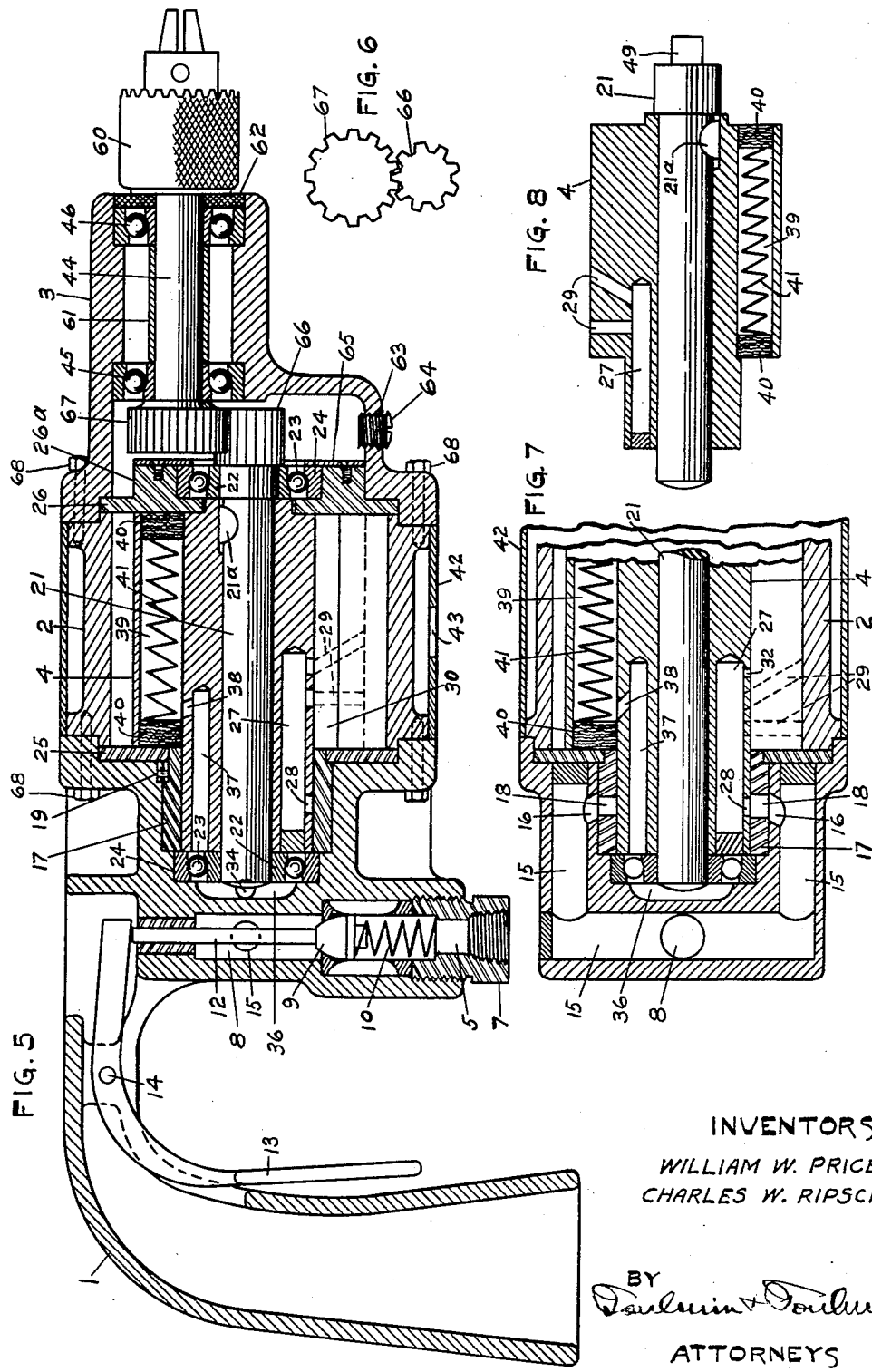

Patented May 13, 1930

1,758,760

UNITED STATES PATENT OFFICE

WILLIAM W. PRICE AND CHARLES W. RIPSCH, OF DAYTON, OHIO; SAID RIPSCH ASSIGNOR TO SAID PRICE

AIR-DRIVEN IMPLEMENT OR TOOL

Application filed June 17, 1924. Serial No. 720,682.

This invention relates to improvements in air driven implements or tools designed to rotate at high speeds emery or corundum wheels, drills, etc.

This invention is in the nature of an improvement on the air driven implement set forth in Letters Patent No. 1,322,107 dated November 18, 1919, and issued to A. C. Gressle and R. E. Asbury, under which patent the assignee of this present invention is manufacturing.

In the pursuit of this industry this assignee, conjointly with his co-inventor, developed the invention set forth herein with certain objects in view.

These objects essentially, are to so simplify and construct the rotor element with air and lubricant chambers and ports therefor as to facilitate the manufacture of the implement; to provide for causing the air or pressure medium, which constitutes the motive agent, to operate on the pistons by pressure through a part of the stroke and by pressure due to expansion during the remainder of the stroke; and also to enable the introduction of the air into the cylinder in a manner to hasten and make earlier the impulse of the pistons so as to increase the speed of rotation; which several objects are hereinafter more fully stated in detail in connection with the means for carrying them into effect.

Referring now to the drawings which form a part of this specification:

Figure 1 is a longitudinal sectional view through the implement or tool taken on the line 1—1 of Figure 4.

Figure 2 is an end elevation of the implement looking at the handle in end.

Figure 3 is a transverse sectional view taken on the line 3—3 of Figure 1 looking in the direction of the arrows.

Figure 4 is also a transverse sectional view but taken on the line 4—4 of Figure 1 looking in the direction of the arrows.

Figure 5 is another longitudinal sectional view of the implement taken on the line 5—5 also of Figure 4 and showing in Figure 5 a modification in respect to gears for driving the driven shaft.

Figure 6 is a detail elevation of the two gears employed for that purpose.

Figure 7 is a longitudinal sectional view through a portion of the implement taken on the line 7—7 of Figure 2.

Figure 8 is a longitudinal sectional view of the rotor removed from the remainder of the apparatus.

By referring to the drawings it will be seen that our improved implement is composed of four general features—the handle section indicated at 1; the cylinder section indicated at 2; the driven shaft section designated 3, and the rotor element designated generally by the numeral 4.

The handle section consists of a handle proper having an air inlet channel 5 into which is screwed a bushing 6 to receive a coupling 7 adapted for connection with a hose or other means of supply of the pressure medium constituting the motive agent, usually compressed air. The channel 5 leads into an inlet passage 8 controlled by a valve 9 seated by a spring 10 held in place by a screw-threaded cap 11. The valve has an extended stem 12 which projects outside of the handle section and is adapted to be raised off its seat by a bell crank lever 13 pivoted at 14. When the valve is lifted from its seat the air under pressure will enter from the channel 5 into the passage 8 and thence through the branch passages 15 more clearly shown in Figure 7. From the branches 15 the air passes through ports 16 formed in the inner wall of the handle section. These ports 16 are controlled as to the time of their opening and closing by an adjustable sleeve valve 17 which is carried by the handle section 1, and is formed with port slots 18 as more clearly seen in Figures 3 and 7. When the port slots 18 register with certain ports in the rotor, to be presently mentioned, the pressure medium, such as compressed air, is thereby introduced into the rotor. The sleeve valve 17 is capable of circumferential adjustment by disconnecting the handle section from the remainder of the implement so as to expose to a screw-driver or other implement the threaded key 19 which is embedded partly in the sleeve and partly in the handle member as seen in Figures 3 and 5. One or more threaded recesses in the sleeve indicated at 20, see Figure 3, provide for this adjustment.

The purpose, as will hereinafter be more fully understood, is to adjust the sleeve valve forward to hasten the impulse of the air on the piston of the rotor, so that this motive agent will begin to enter the cylinder the very moment the inlet port or ports of the rotor begin to open at their outer ends as they move away from the cylinder wall. Observe from Figure 3 how the left-hand inlet port 28 of the rotor has just opened to admit air behind the piston. By adjusting in a forward or counterclockwise direction the valve sleeve 17 so as to hasten the bringing of the port slots 18 in register with the ports in the rotor the air will be admitted that much earlier into the cylinder and at a time when the rotor ports are just being uncovered as the rotor moves them tangentially to the inner wall of the cylinder. This hastens the beginning of the pressure of the air on the pistons and makes the pressure stroke somewhat longer. We may add at this point that we have indicated by the word "pressure" and the dotted line the distance through which the action on the piston is by pressure, when the sleeve valve is adjusted to the position shown in Figure 3; and have indicated by the word "expansion" and the dotted line the section of the stroke in which the air acts expansively. By the adjustment of the sleeve valve above described the pressure action commences earlier than with the valve adjusted in the position shown. In the latter position the port 29, (see left-hand port in Figure 4) commences to discharge air shortly after the end of the port 29 recedes from the cylinder wall as shown in Figure 4. By the other adjustment of the valve the air commences to enter the cylinder the moment there is the slightest separation between the end of the port 29 and the cylinder wall.

Referring now to the rotor we would state that it is composed of a central shaft 21 having at each end a ball-bearing ring 22 mounted to rotate on the balls 23 held in ball races 24 secured in any convenient manner, respectively, in the handle section 1 and the driven shaft section 3 as best seen in Figures 1 and 5. This shaft 21 may be integral with the rest of the rotor or be a separate shaft fitted firmly in the body 4 of the rotor and held by a key 21ª. In this way the rotor is mounted with the least friction within the cylinder 2. Hard steel rings 25 and 26 are placed, respectively, between the handle section and the cylinder 2 and the driven shaft section and the cylinder. In case of wear these rings can be renewed to prevent or take up any lost motion or looseness that might develop. The rotor body is provided with a series of air chambers 27 as seen in Figures 1, 3 and 4, each of which has an inlet port 28 adapted to register, as before stated, with the slot ports 18 of the sleeve valve 17; and outlet ports, one or more, 29 indicated by dotted lines in Figure 1 and by full lines in Figure 4 by means of which the air in the chambers is discharged at the proper time into the cylinder 2 as seen clearly in Figure 4. The body of the rotor is also constructed with a series of chambers 30 in each of which is fitted a piston 31 in the nature of a long blade adapted to slide radially in the chambers. These pistons are kept in contact with the inner wall of the cylinder by means of a minor portion of the motive fluid or air which passes from the air chambers 27 through small ports 32 into the chambers 30 where it acts against the blades. In this manner the blades are effectively held against the cylinder wall to make appropriate contact, during the periods when the pressure and expansion actions of the air are taking place. As the small orifices 32 get their supply of air from the same source, the chamber 27, as do the ports 29, it will be seen that the pistons are put under effective outward pressure at the time they are receiving the pressure and expansion actions of the air. It will also be seen that as the pistons pass the exhaust ports 33 and the air under expansion discharges, the air in the chambers 30 will back out through the orifices 32 and the ports 29 due to the return movement of the pistons caused by their contact with the inner wall of the cylinder.

It will now be understood that we have provided a complete system of air passageways by which this motive agent is introduced into the implement, and is controlled and directed therethrough in a manner to produce high speed and power according to the quantity and pressure of the air admitted, and that a smooth-running and effective rotor results therefrom. We may add that this implement has been manufactured and is now in successful and general use in a large number of manufacturing plants where the use of such a device is one of importance and necessity. The efficiency of this implement and the correctness of the statements made in this specification have in this manner been fully established.

We will now refer to the lubricating system with which we have equipped our implement. It consists of a lubricant passage 34 in the handle section to which access is had by removing a screw cap 35. See Figure 2. This passage 34 opens into a chamber 36 within the handle section into which the lubricant is forced so that it works its way through the ball bearings and enters the lubricant chambers 37 one of which is shown in Figures 1, 5 and 7 and all of which are shown in the cross sectional views, Figure 3 and 4. From these chambers the lubricant passes through ports 38 into reservoirs 39. These reservoirs are filled with a lubricant, which is preferably in the nature of a grease of convenient consistency. At the ends of the reservoirs are porous or absorbent packings 40 through which the lubricant works its way to lubricate the ends of the body of the rotor which contact with the rings 25 and 26. The lubricant also works its way between the sleeve valve 17 and that part of the rotor which revolves within it. From Figure 4 it will be seen that from each chamber 37 there are two ports 38 which extend each to one of the reservoirs 39. Springs 41 keep the packings 40 pressed against the faces of the rings 25 and 26 so that the lubricant will not waste or spill out of the reservoirs.

By this lubricating system we have found that the rotor and its bearings do not heat notwithstanding the high speed of the rotor, ranging from 2500 to 4000 revolutions per minute.

We prefer to encase the cylinder 2 in a casing 42 which fits round the cylinder and between the handle and shaft sections. This casing may be of an ornamental character as burnished steel or nickel-plated. An opening 43 in the casing may be made for the purpose of the escape of the exhausted air. Its primary purpose is to muffle the exhaust noise and also to confine the expanded exhaust air to cause it to cool the cylinder which it thus surrounds.

Referring now to the driven shaft section 3 of which two forms are shown, one form in Figure 1 and another in Figure 5 it will be seen that a driven or tool shaft 44 is mounted therein through ball bearings 45 and 46. The interior of this section is supplied with a lubricant through an opening 47 closed by a removable screw 48. In this way the ball bearings 45 and 46 as well as the bearings 22 and 23 are lubricated. In the form shown in Figure 1 the rotor shaft 21 and the driven shaft 44 are interconnected by means of a tenon 49 projecting from the shaft 21 and a recess 50 in the shaft 44, into which the tenon fits firmly. In this form also we screw-thread the shaft 44 as seen at 51 and 52, and place on this shaft these respective clamping disks 53 and 54. A bushing 55 screws into the end of this section of the implement, and it and the clamping disk 53 maintain the ball bearing 46 in place. A lock-nut 56 serves to lock the clamping disk 54. An emery wheel 57 may thus be firmly secured on the driven shaft and may be easily applied and removed. This emery wheel is one of the tools that may be operated by this implement. To protect the operator, a housing 58 is adapted to slip over the section 3 and to be clamped thereon by a bolt 59. It sufficiently envelops the emery wheel to protect the operator from flying sparks and hot fragments as well as against danger in case of breakage of the wheel itself.

In Figure 5 the clamping disks are omitted and a chuck of any conventional type such as indicated at 60 is applied to the shaft 44 and used to clamp small tools such as drills, reamers, etc., the user may desire to operate by this implement. In this form also we prefer to place a sleeve 61 between the ball bearings 45 and 46 for the purpose of holding the ball bearings 45 and 46. A disc 62 of felt or similar material is snugly fitted in the end of this section of the implement to prevent the lubricant from leaking out. The lubricant is introduced through an orifice 63 closed by a screw plug 64. In this way the ball bearings 22 and 23, and 45 and 46 are effectively lubricated. A thin plate 65 is screwed to the ring 26, which in this case has a boss 26$^a$ to form a housing for the support of the ball bearing 22, 23, while the plate 65 maintains such bearing in place.

In this form of our implement we operate the driven shaft 44 by the rotor shaft 21 not directly as in Figure 1 but by means of the driving pinion 66 on the shaft 21 and a larger driven pinion 67 on the shaft 44. The proportions of the two pinions slow down the speed of the shaft 44 as compared with that of the shaft 21, so as not to drive the tools at so high a speed as the latter.

Thus it will be seen that we have produced an implement in a form and fashion which may be readily and economically manufactured and may be assembled with ease and facility, the handle section and the driven shaft section being connected to the cylinder section as by bolts 68 anchored in lugs 69 on the cylinder section 2 and pass through the handle and shaft sections where nuts are applied as indicated in Figure 1.

And it will also be observed that we have provided a system of introducing the motive fluid or air under pressure in a manner to make this agent highly effective in driving the rotor. In this branch of the invention is included the sleeve valve adjustable in its relation to the rotor so as to hasten the impulses of the air by enabling it to pass through the air chambers and ports to the cylinder immediately the delivery ports 29 are slightly opened as they pass slightly from the inner wall of the cylinder, so that the air pressure will begin to act on the pistons at the earliest possible moment after these pistons and ports 29 enter and open, respectively, into the narrow space formed by the diversions of the cylinder wall and the periphery of the rotor, as best seen in Figure 4.

Again, it will be noted that by our improved organization we utilize first the pressure of the air to drive the pistons and then the expansion of the air to continue the driving impulses until the exhaust port is reached.

And it will be further noted that when the air is being exhausted from the cylinder and the pistons are about to be forced back into their channels, the air within the channels in back of the pistons is at that time permitted also to escape so as to prevent resisting the inward movement of the pistons which if not avoided would cause the pistons to work hard against the cylinder wall as they proceed toward the minor diameter of the cylinder.

It will be understood that we desire to comprehend within our invention such modifications as may be necessary to adapt it to varying conditions.

Having thus fully described our invention, what we claim as new and desire to secure by Letters Patent is:

1. In an implement of the character described, a handle section having air inlet passages, a valve therein and exterior means to control it, branch passages connecting with inlet passages, a cylinder section, a sleeve valve, a rotor on which it is mounted, such rotor being within the cylinder section having air chambers opened and closed by said sleeve valve, and ports from said chambers discharging into the cylinder, pistons mounted in the body of the rotor in advance of said ports, a driven shaft section, a shaft mounted therein and operatively connected with the rotor, a lubricant passage in the handle section, lubricant chambers and lubricant reservoirs both in the rotor communicating through ports.

2. In an implement of the character described, the combination with a handle section, a cylinder section and a driven shaft section, of a driven shaft mounted in the latter section, a rotor comprised of a shaft and body, such shaft being mounted in the handle and driven shaft sections, and such rotor having two systems of passageways, one for air and one for a lubricant, such air system comprising chambers and ports in the rotor one set of ports to receive air and another to deliver it into the cylinder, pistons mounted in the rotor in advance of the ports which discharge into the cylinder, exhaust ports for the cylinder, the other system comprising lubricant chambers and reservoirs both in the rotor with ports between them, a sleeve valve in the handle section mounted on said rotor and adapted to admit to and cut off from said air chambers, a supply of air, and a system of air passages and lubricant passages in the handle section, such passages respectively adapted to deliver air to said air chambers through said valve and lubricant to said lubricant chambers, a valve in one of the air passages in the handle and exterior means to control it.

3. In an implement of the character described, the combination with a handle section, a cylinder section and a driven shaft section, of a rotor comprising a shaft mounted in the handle and shaft sections and a body within the cylinder section, and two systems of passages in the rotor and handle section, one for air and one for a lubricant, such air system comprising air chambers in the body of the rotor with inlet ports and outlet ports from such chamber, the latter ports opening into the cylinder, such lubricant system comprising lubricant chambers and reservoirs in the body of the rotor with ports between them, and air and lubricant systems in the handle section, such air system comprising air passages, a valve therein and exterior means to control it, and such lubricant system comprising a lubricant passage and chamber leading to the lubricant chambers in the rotor, and a sleeve valve mounted on said rotor between the air passages in the handle section and the air chambers in the rotor to time the admission of air.

4. In an implement of the character described, a cylinder section and a rotor mounted to rotate therein, such rotor having a system of air passages comprising air chambers with inlet and outlet ports, the latter discharging into the cylinder, pistons mounted in the rotor in advance of said latter ports and a sleeve valve mounted on the rotor to control the admission of air to said air chambers, whereby air will flow through such valve chambers and ports into the cylinder and exert pressure on said pistons during a part of their travel while extended into the cylinder, and whereby during the remainder of their travel they are driven by the expansion of the air so admitted.

5. In an implement of the character described, a cylinder section and a rotor mounted to rotate therein, such rotor having a system of air passages comprising air chambers with inlet and outlet ports, the latter discharging into the cylinder, chambers in the rotor in advance of said last-named ports, a piston in each chamber and a port between each pair of pistons and air chambers, and a sleeve valve mounted on said rotor and surrounding said air chambers and adapted to be positioned to admit air into said chambers and thence into the cylinder during approximately one-half of the travel of said pistons when extended into the cylinder, said ports between the air and piston chambers admitting air to project the pistons into the cylinder, whereby during a part of the travel of the pistons in the cylinder they are impelled by air pressure and during the remainder of the travel are impelled by air expansion, and suitable exhaust ports for the discharge of the air from the cylinder and from the piston chambers as the pistons travel inward in their chambers.

6. In an implement of the character described, a rotor comprising a shaft and a body, the body having a series of air chambers each with an inlet and outlet port in the body thereof, the latter ports adapted to discharge into a cylinder, and a series of lubricant chambers and reservoirs each two connected by a port, and a sleeve valve mounted round that part of the rotor and the inlet ports to the air chambers, such valve being adapted to be positioned to admit air to said ports in succession as the rotor revolves, and pistons mounted in the rotor adapted to be driven rotatively by the air delivered from said system of air chambers and ports as controlled by said sleeve valve.

7. In an implement of the character described, a rotor comprised of a solid shaft and a rotor body carried thereby, and having a series of longitudinal air chambers in the body, each chamber having an inlet and one or more outlet ports, and having also a series of piston chambers, a piston in each chamber, and a port between each piston chamber and air chamber, and a series of lubricant chambers and reservoirs with ports between them.

8. In an implement of the character described, the combination with a handle section thereof, of a rotor, one portion of which is adapted to extend into said handle section, such portion having air chambers and ports, and a sleeve valve mounted round said portion of the rotor and within said section, and adapted to be differently positioned circumferentially and means to secure said sleeve valve in such positions respectively.

In testimony whereof, we affix our signatures.

WILLIAM W. PRICE.
CHARLES W. RIPSCH.